United States Patent [19]

Schmadel

[11] 3,816,378
[45] June 11, 1974

[54] POLYESTER SALTS CONTAINING QUATERNARY AMMONIUM GROUPS

[75] Inventor: Edmund Schmadel, Mettmann, Germany

[73] Assignee: Henkel & Cie GmbH, Dusseldorf-Holthausen, Germany

[22] Filed: June 11, 1973

[21] Appl. No.: 369,076

Related U.S. Application Data

[63] Continuation of Ser. No. 188,940, Oct. 13, 1971, abandoned.

[30] Foreign Application Priority Data

Nov. 4, 1970  Germany............................ 2054097

[52] U.S. Cl.................. 260/75 N, 252/99, 252/527, 252/546, 260/481 R, 260/485 G
[51] Int. Cl........................ C08g 17/12, C08g 17/04
[58] Field of Search........... 260/75 N, 485 G, 481 R

[56] References Cited
UNITED STATES PATENTS
3,448,128  6/1969  Marumo et al. .................... 260/429
3,563,905  2/1971  Schmadel et al. .................. 252/545

FOREIGN PATENTS OR APPLICATIONS
38,808  12/1970  Japan

Primary Examiner—Melvin Goldstein
Attorney, Agent, or Firm—Hammond & Littell

[57] ABSTRACT

This invention relates to polyester salts containing quaternary ammonium groups, obtainable by polycondensation of N-alkyl-dialkanolamines with dicarboxylic acids, particularly maleic acid, and quaternization of the polyester with a haloacetic acid. Additional sulfonic acid groups can be introduced into the polyester molecule by reaction with an alkali metal hydrogen sulfite. The polyester salts are utilized as soil suspension agents in washing compositions.

6 Claims, No Drawings

3,816,378

POLYESTER SALTS CONTAINING QUATERNARY AMMONIUM GROUPS

This is a continuation, of Ser. No. 188,940, filed Oct. 13, 1971 and now abandoned.

THE PRIOR ART

It has been known to add substances which improve the soil suspension power of the washing liquors to washing and cleaning agents that contain surface-active compounds. Such substances, commonly called soil suspension agents or greying inhibitors, prevent a resorption of the detached soil on the cleaned surfaces. They are mostly polyanionic polymers, that are prepared either from natural substances, such as cellulose, gelatin or glue or by polymerization of vinyl compounds, such as acrylic acid, methacrylic acid, maleic acid or their mixtures with copolymerizable olefins. The polysulfonates of vinyl polymers have also been recommended as greying-inhibiting aditives to washing and cleansing agents. However, only carboxymethylcellulose has, of the compounds considered, obtained any great technical importance, particularly as it surpasses, in its greying-inhibiting effect, numerous known synthetic polymers. Carboxymethylcellulose and also the other synthetic polymers named have, however, the disadvantage that their greying-preventing effect is limited to cellulosic fibers. They are largely ineffective in the washing of synthetic fiber materials, chemically changed cellulose or finished cotton. This disadvantage is particularly observable in white textiles from polyester or polyolefin fibers, non-iron finished cotton and in mixed fabrics of the so-called synthetic fibers with cellulose fibers, which become grey, in spite of frequent washing, and thus become unattractive.

OBJECTS OF THE INVENTION

An object of the present invention is the development of a soil suspension agent which avoids the drawbacks of the prior art agents and which is effective with textiles of synthetic fibers.

Another object of the present invention is the development of a polyester salt, containing quaternary ammonium groups, suitable for use in washing agents as a soil suspension agent, having the formula

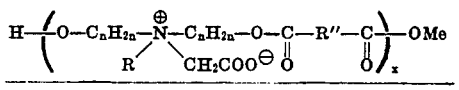

wherein R represents a hydrocarbon with 6 to 24 carbon atoms, R'' represents a divalent linkage selected from the group consisting of R', where R' represents a hydrocarbon with 1 to 10 carbon atoms,

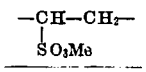

and mixtures thereof, Me represents a metal selected from the group consisting of sodium and potassium, $n$ represents the integers 2, 3 or 4, and $x$ represents a whole number from 5 to 5,000.

A further object of the invention is the development of a process for cleansing textiles which comprises immersing soiled textiles in a conventional neutral to alkaline aqueous washing liquor bath containing from 0.005 to 1 gm/liter of the above polyester salt, containing quaternary ammonium groups, for a time sufficient to effect cleansing, whereby redeposit of suspended soil is substantially avoided, and removing said cleansed textiles.

A yet further object of the invention is the development of washing agent compositions based on anionic, non-ionic and amphoteric surface-active compounds and builder salts, containing from 0.1 to 20 percent by weight of the above polyester salt, containing quaternary ammonium groups.

These and other objects of the invention will become more apparent as the description thereof proceeds.

DESCRIPTION OF THE INVENTION

The above objects have been achieved and the drawbacks of the prior art overcome by the development of polyester salts, containing quaternary ammonium groups which effect suspension of soil in textile washing bath liquors.

The invention relates to polyester salts, containing quaternary ammonium groups, suitable for the use in washing agents, characterized by the formula

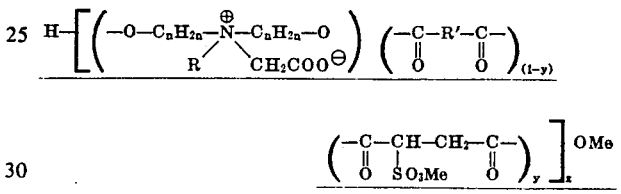

in which R represents a hydrocarbon radical with 6 to 24 carbon atoms, R' represents a hydrocarbon radical with 1 to 10 carbon atoms, Me represents sodium or potassium, $x$ represents a whole number from 5 to 5,000, $n$ represents the numbers 2, 3, or 4 and $y$ any number from 0 to 1 including fractional numbers. When $y$ represents a fractional number the polyester molecule contains both the dicarboxylic acid moiety

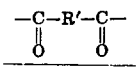

and the sulfosuccinic moiety.

Preferably the polyester salts of the invention are a polyester salt, containing quaternary ammonium groups, suitable for use in washing agents as a soil suspension agent, having the formula

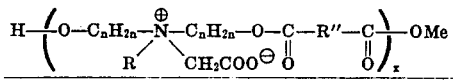

wherein R represents a hydrocarbon with 6 to 24 carbon atoms, R'' represents a divalent linkage selected from the group consisting of R', where R' represents a hydrocarbon with 1 to 10 carbon atoms,

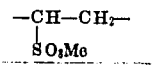

and mixtures thereof, Me represents a metal selected from the group consisting of sodium and potassium, $n$ represents the integers 2, 3 or 4, and $x$ represents a whole number from 5 to 5,000.

In either of the above formulas R is a hydrocarbon having 6 to 24 carbon atoms, preferably 10 to 20 carbon atoms, selected from the group consisting of alkyl, alkenyl, phenyl, phenylalkyl, alkylphenyl, cycloalkyl, cycloalkylalkyl and alkylcycloalkyl; R' is a divalent hydrocarbon having 1 to 10 carbon atoms preferably selected from the group consisting of alkylene, alkenylene, phenylene, alkylphenylene, cyclohexylene and cyclohexenylene; and $C_nH_{2n}$ represents, preferably, ethylene, propylene, isopropylene, butylene and isobutylene.

The N-substituted dialkanolamine radicals, contained in the above-named polyester salts, are derived, for example, from dipropanolamine, diisopropanolamine or dibutanolamine, however, particularly from diethanolamine and have on the nitrogen atom an aliphatic, cycloaliphatic or aromatic hydrocarbon radical, however, preferably a straight-chain alkyl radical with 6 to 24 and particularly 10 to 20 carbon atoms. Examples for such alkyls are hexyl, octyl, decyl, dodecyl, tetradecyl, hexadecyl, octadecyl and eicosyl. Also mixtures of N-alkylated dialkanolamines, that have different alkyl groups, are usable as starting substances.

If dicarboxylic acid radicals of the formula

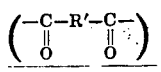

are contained in the polyester salts, they are derived from saturated or unsaturated aliphatic, cycloaliphatic or aromatic dicarboxylic acids, such as malonic acid, succinic acid, glutaric acid, adipic acid, pimelic acid, suberic acid, azelaic acid, sebacic acid, maleic acid, fumaric acid, phthalic acid and terephthalic acid. These dicarboxylic acid radicals may be replaced totally or partly by sulfosuccinic acid radicals of the formula

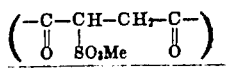

If the polyester salts contain both the above-named dicarboxylic acid radicals and the sulfosuccinic acid radicals, the molar ratio of these radicals to each other may have any value.

Particularly suitable are such polyester salts that are derived from N-alkylated diethanolamines and maleic acid or their sulfonation products. Examples for such polyester salts are such of the formulae

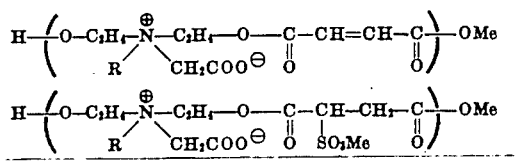

in which R and Me have the above-named meanings.

The preparation of the polyester salts, according to the invention, can be carried out in a known manner by esterification of the monomeric starting compounds, quaternization of the obtained polyester with the aid of a haloacetic acid, such as chloroacetic or bromoacetic acid and, if necessary, sulfonation of the olefinic double bonds, contained in the maleic acid moieties.

The esterification of the reaction components, that are charged in the molar ratio 0.9:1 to 1:0.9, preferably 1:1, is performed, for instance, by heating for several hours under normal pressure, under vacuum or in the presence of a solvent with which the reaction water can be distilled off azeotropically. The reaction can be speeded up by the addition of conventional esterification catalysts, particularly of strong inorganic or organic acids, such as sulfuric acid or p-toluenesulfonic acid. Instead of the free dicarboxylic acids, their reactive derivatives, such as anhydrides or halides may also be charged as starting compounds. Likewise, the dicarboxylic acids in the form of their dimethyl or diethyl esters can be transesterified with the dialkanolamines in the presence of customary transesterification catalysts in a known manner.

The quaternization of the polyester with the aid of salts, particularly sodium or potassium salts of haloacetic acids, such as monochloroacetic acid or monobromoacetic acid can be carried out in the melt or in the presence of solvents. Advantageously, the reaction is carried out by suspending the polyester in water and, after addition of the chloroacetate or bromoacetate, heating until the polyester is completely dissolved, whereby the termination of the reaction is indicated.

If sulfonate groups are to be inserted into the polyester molecule, a portion of maleic acid is employed and this is done appropriately by addition of sodium or potassium bisulfite to the double bond of the maleic acid moiety. This reaction is appropriately carried out in an aqueous medium, optionally also in the presence of free radical catalysts, such as peroxides. By the selection of a respective deficit or excess of bisulfite, it is possible to sulfonate only a part of the double bonds, contained in the polyester or also all maleic acid radicals. Preferably the reaction is carried out with a certain excess of sulfonation agents, in order to attain as complete a reaction as possible.

Instead of the bisulfite other sulfonation agents may be used, such as complex compounds of sulfur trioxide and dioxan, pyridine, or N,N-dimethylaniline. It is also possible to carry out the sulfonation of the polyester before the quaternization reaction.

The polyester salts containing quaternary ammonium groups or optionally sulfonate groups of the invention have a resin-like consistency and are insoluble in organic solvents, but easily soluble in water. They may also contain subordinate amounts of lower molecular weight esters or of unreacted starting materials. These can be removed by extraction with organic solvents and optionally again reacted. Since these byproduct compounds do, however, not impair the cleaning properties of the agents, a separation is generally not required.

Because of the insolubility of the high molecular weight polyesters in organic solvents and their content of lower molecular weight fractions, the conventional methods of molecular weight determinations give only approximate values. The average degree of polymerization of the polyester salts, which corresponds in the preceding formulae to the number $x$, is preferably between 10 and 1,000.

The preferred field of application of the novel polyester salts are in washing agent compositions that contain surface-active, wash-active compounds, such as anionic, non-ionic and amphoteric detergents, and nonsurface-active builder salts, such as condensed phosphates, sequestering agents and washing alkalis and optionally auxiliaries and supplements customary in washing agent formulations.

Suitable washing raw materials are anionic surface-active compounds, such as of the sulfonate or the sulfate type, for instance, alkylbenzenesulfonates, particularly n-dodecylbenzenesulfonate, also olefin sulfonates, as they are obtained, for instance, by sulfonation of primary or secondary aliphatic monoolefins with gaseous sulfur trioxide and subsequent alkaline or acidic hydrolysis, as well as alkylsulfonates as they are obtainable from n-alkanes by sulfochlorination or sulfoxidation and subsequent hydrolysis or neutralization or by bisulfite addition to olefins. Suitable are also α-sulfofatty acid esters, primary and secondary alkylsulfates as well as the sulfates of ethoxylated or propoxylated higher molecular weight alcohols.

Further compounds of this class of anionic surface-active compounds that can optionally be present in the washing agents, are the higher molecular sulfated partial ethers and partial esters of polyhydric alcohols, such as the alkali metal salts of the monoalkyl ethers or of the monofatty acid esters of glycerinmonosulfuric acid ester or of the 1,2-dihydroxypropanesulfonic acid. Furthermore, the sulfates of ethoxylated or propoxylated fatty acid amides and alkylphenols as well as fatty acid taurides and fatty acid isothionates are suitable.

Further suitable anionic washing raw materials are alkali metal soaps of fatty acids of natural or synthetic origin, such as the sodium soaps of coconut, palm kernel or tallow fatty acids. As amphoteric washing raw materials are amphoteric surface-active compounds, such as alkylbetaines and particularly the alkylsulfobetaines, such as the 3-(N,N-dimethyl-N-alkylammonium)-propane-1-sulfonate and the 3-(N,N-dimethyl-N-alkylammonium)-2-hydroxypropane-1-sulfonate where the alkyl has from 6 to 24 carbon atoms.

The anionic washing raw materials may be present in the form of alkali metal salts, such as sodium and potassium, and ammonium salts as well as salts of organic bases, such as mono-, di- or triethanolamine. If the named anionic and amphoteric compounds have an aliphatic hydrocarbon radical, the latter should preferably have a straight chain with 8 to 22 carbon atoms. In the compounds with an araliphatic hydrocarbon radical, preferably these are alkylphenyls having an unbranched alkyl chain of 6 to 16 carbon atoms.

As non-ionic surface-active wash-active substances, primarily polyglycolether derivatives of alcohols, fatty acids and alkylphenols are suitable that contain 3 to 30 glycolether groups, preferably ethyleneglycol ether groups, and 8 to 20 carbon atoms in the hydrocarbon radical. Particularly suitable are polyglycolether derivatives, in which the number of the ethyleneglycol ether groups is 5 to 15 and whose hydrocarbon radicals derive from straight-chain, primary alcohols with 12 to 18 carbon atoms or from alkyl phenols with a straight-chain alkyl chain with 6 to 14 carbon atoms. By addition of from 3 to 15 mols of propylene oxide to the last named polyethylene glycol ethers or by converting them to acetals, washing agents are obtained that are distinguished by a particularly low foaming power.

Other suitable non-ionic washing raw materials are non-ionic surface-active compounds such as the water-soluble polyethylene oxide adducts to polyoxypropylene glycol, ethylenediaminepolyoxypropylene glycol or alkylenepolyoxypropylene glycol with 1 to 10 carbon atoms in the alkylene, said adducts containing from 20 to 250 ethylene glycol ether groups and from 10 to 100 propylene glycol ether groups. These compounds conventionally contain from 1 to 5 ethylene glycol units per propylene glycol unit. Also non-ionic surface-active compounds of the types of the aminoxides and sulfoxides, that may be optionally ethoxylated, are usable.

The builder salts are ordinarily neutral to alkaline reacting and include alkali metal triphosphates, particularly pentasodium triphosphate. The triphosphates may be present also in mixtures with higher condensed phosphates, such as tetraphosphates or their hydrolysis products, such as acidic or neutral pyrophosphates.

The condensed phosphates may be replaced totally or partially by alkali metal salts of organic sequestering compounds, such as aminopolycarboxylic acids, particularly the alkali metal salts of nitrilotriacetic acid and ethylenediaminetetraacetic acid. Suitable are also the alkali metal salts of diethylenetriaminepentaacetic acid as well as of the higher homologs of the named aminopolycarboxylic acids. These homologs may be prepared, for example, by polymerization of an ester, amide or nitrile of N-acetic acid aziridine and subsequent saponification to carboxylic acid salts or by reaction of polyamines with a molecular weight of 500 to 10,000 with chloroacetic or bromoacetic acid salts in an alkaline medium. Other suitable aminopolycarboxylic acids are poly-(N-succinic acid)-ethyleneimines and poly-(N-tricarballylic acid)-ethyleneimines of an average molecular weight of 500 to 500,000, that are obtainable analogous to the N-acetic acid derivatives.

Further suitable builder salts are the sequestering, water-soluble potassium and particularly sodium salts of higher molecular weight polycarboxylic acids, for example, of polymerizates of ethylenically unsaturated mono-, di- and tricarboxylic acids, such as acrylic acid, maleic acid, fumaric acid, itaconic acid, citric acid, aconitic acid, mesaconic acid and methylenemalonic acid. Also copolymerizates of these carboxylic acids with one of each other or with other monomeric substances, able to be copolymerized therewith, such as ethylenically unsaturated hydrocarbons, for example, ethylene, propylene, isobutylene and styrene with ethylenically unsaturated monocarboxylic acids, such as acrylic acid, methacrylic acid, crotonic acid, and 3-butene carboxylic acid or with other ethylenically unsaturated alcohols, ethers, esters, amides and nitriles, such as vinyl alcohol, allyl alcohol, vinylmethyl ether, acrolein, vinylacetate, acrylamide and acrylonitrile, are usable. Also the copolymerizates of ethylenically unsaturated mono-, di and tricarboxylic acids and polyethylenically unsaturated compounds of different structure are suitable. The polymerizates and mixed polymerizates show an average degree of polymerization from 3 to 6,000 and contain, based on three monomer units, 1 to 9, preferably 2 to 9, carboxylic acid groups, capable of salt formation.

The homopolymeric and copolymeric polycarboxylic acids, capable of salt formation, according to above definition, can be represented by the following formula:

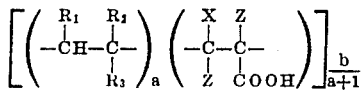

wherein
$R_1$ is hydrogen or —$CH_3$,
$R_2$ is hydrogen or —$CH_3$,
$R_3$ is hydrogen, phenyl, hydroxyl, —$CH_3$, —$CH_2OH$, —$OCH_3$,

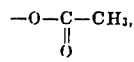

—CHO, —COOH, —$CONH_2$, or —CN,
X is hydrogen or —COOH,
Y is hydrogen, —COOH or —$CH_2COOH$, where X and Y do not both represent —COOH,
Z is hydrogen or, if X = —COOH and Y = H, also —$CH_3$,
$a$ is any number from 0 to 2, and
$b$ is a whole number between 3 and 6,000.

The value of $a$ is not limited to whole numbers, but can be any number, that is, also fractions of whole numbers from 0 to 2.

Other organic builder salts which may be present are sequestering polyphosphonic acid salts, such as the alkali metal salts of aminopolyphosphonic acids, particularly aminotri-(methylenephosphonic acid), 1-hydroxyethane-1,1-diphosphonic acid, methylenephosphonic acid, ethylenediphosphonic acid, and alkali metal salts of the higher monologs of the named polyphosphonic acids. Also mixtures of the above-named sequestering agents are usable.

Among other builder salts, alkali metal silicates are suitable, in which the ratio of $Na_2O:SiO_2$ is 1:3.5 to 1:1. For the adjustment of the pH value also carbonates, bicarbonates and borates of the alkali metals such as sodium or potassium, also acids, such as lactic acid and citric acid may be added. The amount of the alkaline-reacting substances, including the alkali silicates and phosphates, are to be calculated so that the pH of a usable liquor for coarse laundry is 9 to 12 for fine laundry 6 to 9.

As further ingredients of washing agent compositions, bleaching agents which yield active oxygen in aqueous solutions, such as alkali metal perborates, percarbonates, perpyrophosphates and persilicates and urea perhydroperoxides, are suitable in amounts of from 0.5 to 50 percent by weight. Preferably sodium perborate-tetrahydrate is used. For the stabilizing of the percompounds, the agents may contain inorganic or organic stabilizers, such as magnesium silicate, or the organic complexing agents, for instance, in amounts of from 3 to 20 percent by weight, based on the amount of perborate.

For textile laundering at temperatures below 70° C, the so-called cold washing agent may contain bleaching activators such as tetraacetylglycoluril as an ingredient of the powder. The powder particles consisting of the bleaching activator or the percompound can be coated with coating substances, such as water-soluble polymers, fatty acids or granulated salts, such as alkali metal silicates, sodium sulfate or disodium hydrogen phosphate, in order to avoid an interaction between the percompound and the activator during storage.

The washing agent compositions may also contain optical brighteners, particularly derivatives of diaminostilbenedisulfonic acid or their alkali metal salts, of the formula

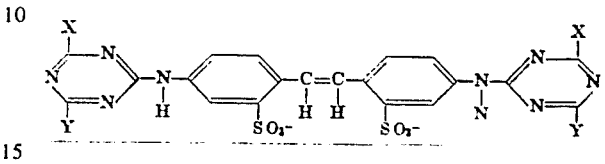

In which X and Y are the following: $NH_2$, $NH—CH_3$, $NH—CH_2—CH_2OH$, $CH_3—N—CH_2—CH_2OH$, $N(CH_2—CH_2OH)$, morpholino, dimethylmorpholino, $NH—C_6H_5$, $NH—C_6H_4—SO_3H$, $OCH_3$, Cl, where X and Y may be identical or different. Particularly suitable are such compounds in which X represents an anilino and Y is a diethanolamino or morpholino group.

Also optical brighteners of the type of the diaryl-pyrazolines of the following formula are suitable:

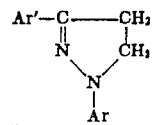

In this formula Ar and Ar' represent aryl radicals, such as phenyl, diphenyl or naphthyl that may carry other substituents, such as hydroxy, alkoxy, hydroxyalkyl, amino, alkylamino, acylamino, carboxyl, sulfonic acid and sulfonamide groups or halogen atoms. Preferably a 1,3-diaryl-pyrazolone derivative is used in which the radical Ar represents a p-sulfonamido phenyl group and the radical Ar' represents a p-chlorophenyl group.

Further suitable whiteners or optical brighteners are such of the type of naphthotriazolestilbenesulfonates, ethylene-bis-benzimidazoles, ethylene-bis-benzoxazoles, thiophene-bis-benzoxazoles, dialkylaminocoumarins and cyanoanthracenes. Also mixtures of optical brighteners are usable. The optical brighteners are usually present in an amount of from 0.05 to 1.5 percent, preferably from 0.07 to 1 percent by weight.

The washing agent compositions may further contain enzymes from the class of the proteases, lipases and amylases or their mixtures. The enzymes may be of animal or plant origin, for instance, as obtained from digestive enzymes or yeasts, such as pepsin, pancreatin, trypsin, papain, catalase and diastase. Preferably, enzymatic active substances are used as obtained from bacteria strains or molds, such as Bacillus subtilis and Streptomyces griseus, which are relatively stable towards alkalis, percompounds and anionic detergents and also at temperatures between 50° and 70° C are not yet considerably inactivated.

Further ingredients that may be contained in the washing agent composition, according to the invention, are neutral inorganic salts, particularly sodium sulfate, bacteriostatic substances, such as halogenated phenolethers and phenolthioethers, halogenated carbanilides and salicylanilides as well as halogenated diphenylmethanes; also dyes and perfumes.

Liquid washing agent compositions may contain hydrotropic substances and solvents in addition, such as alkali metal salts of benzene, toluylene or xylene sulfonic acid, urea, glycerin, polyglycerin, di- or trioxyethylene glycol, polyoxyethylene glycol, ethanol, i-propanol and ether alcohols.

Optionally the washing agent compositions may also contain known foam inhibitors, such as saturated fatty acids with 20 to 24 carbon atoms, or their alkali metal soaps, higher molecular weight fatty acid esters or triglycerides or trialkylmelamines.

For the further increase in the soil suspension power also other known greying inhibitors, particularly sodium cellulose glycolate (carboxymethylcellulose) may be added. The simultaneous use of the polyester salts, according to the invention, with celluloseglycolate is particularly advantageous in the cleaning of textiles from cellulosic fibers and synthetic fibers containing mixed fabrics.

The qualitative and quantitative composition of these washing agents depends largely upon their field of application. The content of polyester salts in the compounded washing agents amounts to 0.1 to 20 percent, preferably 0.2 to 10 percent by weight. The difference of 80 to 99.1 percent, preferably 90 to 99.8 percent by weight, is the other washing agent ingredients, whose quantitative composition may correspond to the following scheme (data in percent by weight):

1 to 40 percent of at least one compound from the class of anionic, non-ionic and amphoteric surface-active compounds,
10 to 80 percent of at least one non-surface-active, cleaning intensifier or sequestering builder salt,
10 to 50 percent of a percompound, particularly sodium perborate with or without water of crystallization as well as their mixtures with stabilizers and activators,
0.1 to 20 percent of other auxiliaries and supplements.

The surface-active compounds may consist up to 100 percent, preferably 5 to 70 percent, of compounds of the sulfonate and/or sulfate type, up to 100 percent, preferably 5 to 40 percent of non-ionic compounds of the polyglycol ether type and up to 100 percent, preferably 10 to 50 percent of soap. The builder salts may be composed up to 100 percent, preferably 25 to 95 percent, of alkali metal triphosphates and their mixtures with alkali metal pyrophosphates, up to 100 percent, preferably 5 to 50 percent, of an alkali metal salt of a sequestering agent from the class of the polyphosphonic acids, nitrilotriacetic acid, ethylenediaminetetraacetic acid, and up to 100 percent, preferably 5 to 75 percent, of at least one compound from the class of the alkali metal silicates, alkali metal carbonates, and alkali metal borates.

To the other auxiliaries and supplements belong, besides the optical brighteners, particularly the foam inhibitors, which may be present in the agents of the invention in amounts of from 0 up to 5 percent, preferably in amounts of 0.2 to 3 percent, also the enzymes, that may be present in an amount of from 0 up to 5 percent, preferably 0.2 to 3 percent, and the carboxymethylcellulose whose share may be from 0 up to 5 percent, preferably 0.2 to 3 percent, all by weight of the total composition.

The washing agent compositions of the invention are utilized in amounts of from 0.4 gm to 8.0 gm per liter in an aqueous washing liquor bath. The washing of the soiled textiles is conducted at temperatures of from 20° to 100° C for a time sufficient to clean the textiles. In the washing liquor bath, the share of the polyester sulfonates containing quaternary ammonium compounds usually amounts to from 0.005 to 1 gm/liter.

The following examples are illustrative of the practice of the invention without being limitative in any respect.

EXAMPLES

A. Preparation of the Polyester Salts

The preparation of the polyester salts is shown in the following in the example of a reaction product from maleic acid and N-dodecyldiethanolamine. The other compounds are synthesized in an analogous manner.

I. Esterification a. 1 Mol (98.1 gm) of maleic acid anhydride and 1 mol (273 gm) of N-dodecyldiethanolamine were heated with agitation to temperatures from 150° to 170° C until the formation and evolution of water of reaction was completed. In place of the anhydride, also 1 mol (116.1 gm) of maleic acid may be used.

b. 1 Mol of maleic acid anhydride or 1 mol of maleic acid, 1 mol of N-dodecyldiethanolamine and 1 gm of p-toluenesulfonic acid were dissolved in 250 gm of xylol and, in a distilling apparatus, equipped with a device for separating the water distilled and returning the solvent, heated until no further water separated in the receiver. Subsequently the solvent was distilled off.

II. Quaternization

The polyester (1 mol), obtained by the process of I(a) or (b), was dispersed in 1 liter of water and treated at room temperature with 1 mol (116.5 gm) of sodium chloracetate. With continuous agitation the mixture was heated to boiling until complete solution was attained. This took from 5 to 8 hours. The solution can be used directly or evaporated to dryness or spray-dried.

III. Sulfonation

The solution of the polyester salt, obtained by the process of II, was heated to boiling with 2 mols of sodium bisulfite (190 gm of $Na_2S_2O_5$), until by analysis no further consumption of sulfite was found. Excess sodium bisulfite was oxidized to sodium sulfate by the addition of hydrogen peroxide. The aqueous solution of the polyester salt may be used as is or it may be evaporated to dryness or spray-dried.

In the following Table the polyester salts, prepared in the described way, are listed. The molar ratio between dicarboxylic acid and N-alkyldiethanolamine was 1:1. The number $x$ designated the degree of polycondensation. The column under R gives the N-alkyl radical.

TABLE I

| Example No. | Ester Designation | Starting Materials | | | Mol Bisulfite per mol Polyester |
|---|---|---|---|---|---|
| | | $x$ | Dicarboxylic Acid | R | |
| 1 | $PS_1$ | 250 | maleic acid | dodecyl | 0 |
| 2 | $PS_2$ | 240 | maleic acid | tetradecyl | 0 |
| 3 | $PS_3$ | 220 | maleic acid | octadecyl | 0 |

Table I—Continued

| | | | | | |
|---|---|---|---|---|---|
| 4 | PS₄ | 250 | maleic acid | dodecyl | 2:1 |
| 5 | PS₅ | 220 | maleic acid | octadecyl | 2:1 |
| 6 | PS₆ | 250 | maleic acid | dodecyl | 0.5:1 |
| 7 | PS₇ | 160 | 0.5 mol maleic acid 0.5 mol adipic acid | dodecyl | 0 |
| 8 | PS₈ | 160 | 0.5 mol maleic acid 0.5 mol adipic acid | dodecyl | 1:1 | carried out. The results are summarized in the following Table II.

It follows from the remission values that in utilizing the polyester salts, according to the invention, in all cases a reduction of the greying of the textile fibers occurs. If, instead of the agents of the invention, carboxymethylcellulose was used, no noteworthy improvement on the fabrics from synthetic fibers or such from finished cotton toward the comparative value without greying inhibitor was attained, that is, the increase of the remission values was below 1 percent.

TABLE II

| Fiber material | Goods/liquor ratio | Wash. temp., deg. | Percent remission at use of— | | | | | | | | No greying inhibitor |
|---|---|---|---|---|---|---|---|---|---|---|---|
| | | | PS₁ | PS₂ | PS₃ | PS₄ | PS₅ | PS₆ | PS₇ | PS₈ | |
| Polyurethane | 1:30 | 60 | 68.7 | 70.3 | 70.5 | 67.8 | 68.5 | 68.6 | 68.5 | 67.5 | 64.7 |
| Polyacrylonitrile | 1:30 | 40 | 76.5 | 75.5 | 71.0 | 70.0 | 71.0 | 72.4 | 76.2 | 70.2 | 69.0 |
| Polypropylene | 1:12 | 95 | 22.4 | 22.0 | 21.5 | 21.5 | 21.8 | 22.0 | 22.2 | 22.0 | 20.7 |
| Polyester | 1:30 | 60 | 63.9 | 60.5 | 58.9 | 59.3 | 59.4 | 60.2 | 63.0 | 60.0 | 51.5 |
| Cotton | 1:12 | 95 | 65.1 | 65.2 | 63.4 | 58.9 | 60.1 | 62.5 | 65.5 | 59.2 | 53.2 |
| Cotton, highly processed | 1:12 | 95 | 64.7 | 64.5 | 62.0 | 61.6 | 61.0 | 62.8 | 64.6 | 61.4 | 55.7 |
| Polyester cotton | 1:30 | 95 | 73.2 | 74.0 | 73.4 | 72.5 | 73.8 | 73.0 | 73.5 | 72.8 | 70.9 |
| Polyester cotton, highly processed | 1:30 | 60 | 69.9 | 69.7 | 69.7 | 68.8 | 69.2 | 69.5 | 69.5 | 69.0 | 60.5 |
| Polyester/"Polynosic" fiber | 1:30 | 60 | 67.3 | 67.2 | 67.0 | 67.1 | 67.2 | 66.9 | 67.1 | 67.0 | 62.2 |

B. Application Test

The greying-inhibiting effect of the compounds, described in the foregoing examples was tested by the known "Soil Redeposition" method (H. Stupel, "Textil-Praxis" Vol. 3, page 264 [1954]). In this method, each time four swatches of the test fabric of 8.3 gm total weight were washed up to three times in a laboratory washing machine ("Launder-Ometer") together with 1.3 gm of an artificially soiled cotton yarn for 30 minutes. Subsequently the reflection value was determined with a photometer ("Elrepho" utilizing a No. 6 filter).

The close to practice dirt-skin fat combination, used for the soiling of the cotton yarn, consists of a mixture of kaolin, iron oxide black, soot and synthetic skin fat (from 1/3 fatty acids, 1/3 fat and 1/3 hydrocarbons). The cotton yarn contains after soiling about 11 percent of pigments and about 2 percent skin fat.

A washing agent of the following composition (in percent by weight) was compounded:

| Percent | |
|---|---|
| 8 | dodecylbenzenesulfonate (Na-salt) |
| 3 | Oleyl alcohol with 10 ethyleneglycol ether groups |
| 3 | An Na soap from saturated C₁₂ to C₂₂ fatty acids |
| 40 | Pentasodium triphosphate |
| 22 | Sodium perborate |
| 3.5 | Sodium silicate (Na₂O:SiO₂=1:3.3) |
| 2.5 | Magnesium silicate |
| 0.2 | Na nitrilotriacetate |
| 0.3 | Optical brighteners |

To this agent 4 percent of greying inhibitor PS₁ to PS₈ was added. The difference to 100 percent was sodium sulfate.

The application concentration of the washing agents was 5 gm/liter, the water hardness 10° dH (degrees German hardness). The textile samples of the synthetic fabric and the mixed fabrics of finished cotton and synthetic fiber were washed at 40° to 60° C, the samples of finished cotton at 95° C. The weight ratio of textile goods to washing liquor (goods/liquor ratio) was 1:30 or 1:12, as indicated. After a washing time of 30 minutes the textile samples were rinsed four times with distilled water. After three washings the degree of whiteness of the samples was determined by photometer. For comparison wash tests without greying inhibitor were The preceding specific embodiments are illustrative of the practice of the invention. It is to be understood, however, that other expedients known to those skilled in the art, or disclosed herein, may be employed without departing from the spirit of the invention or the scope of the appended claims.

I claim:

1. A polyester salt, containing quaternary ammonium groups, suitable for use in washing agents as a soil suspension agent, having the formula

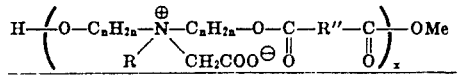

wherein R represents a hydrocarbon with 6 to 24 carbon atoms, R'' represents a divalent linkage selected from the group consisting of R', where R' represents a hydrocarbon with 1 to 10 carbon atoms,

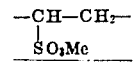

and mixtures thereof,

Me represents a metal selected from the group consisting of sodium and potassium, n represents the integers 2, 3 or 4, and x represents a whole number from 5 to 5,000.

2. The polyester salt of claim 1 wherein R represents a hydrocarbon with 6 to 24 carbon atoms selected from the group consisting of alkyl, alkenyl, phenyl, phenylalkyl, alkylphenyl, cycloalkyl, cycloalkylalkyl and alkylcycloalkyl and R' represents a hydrocarbon with 1 to 10 carbon atoms selected from the group consisting of alkylene, alkenylene, phenylene, alkylphenylene, cyclohexylene and cyclohexenylene.

3. The polyester of claim 2 wherein R represents a straight-chained alkyl with 10 to 20 carbon atoms.

4. The polyester of claim 3 wherein x represents a whole number from 10 to 1,000.

5. The polyester of claim 4 wherein R'' is R' and R' is —CH=CH—.

6. The polyester of claim 4 wherein R'' is

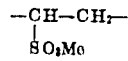

* * * * *